INVENTORS:
Samuel R. Hursh &
Clarence J. Reigh,
BY Paul & Paul
ATTORNEYS

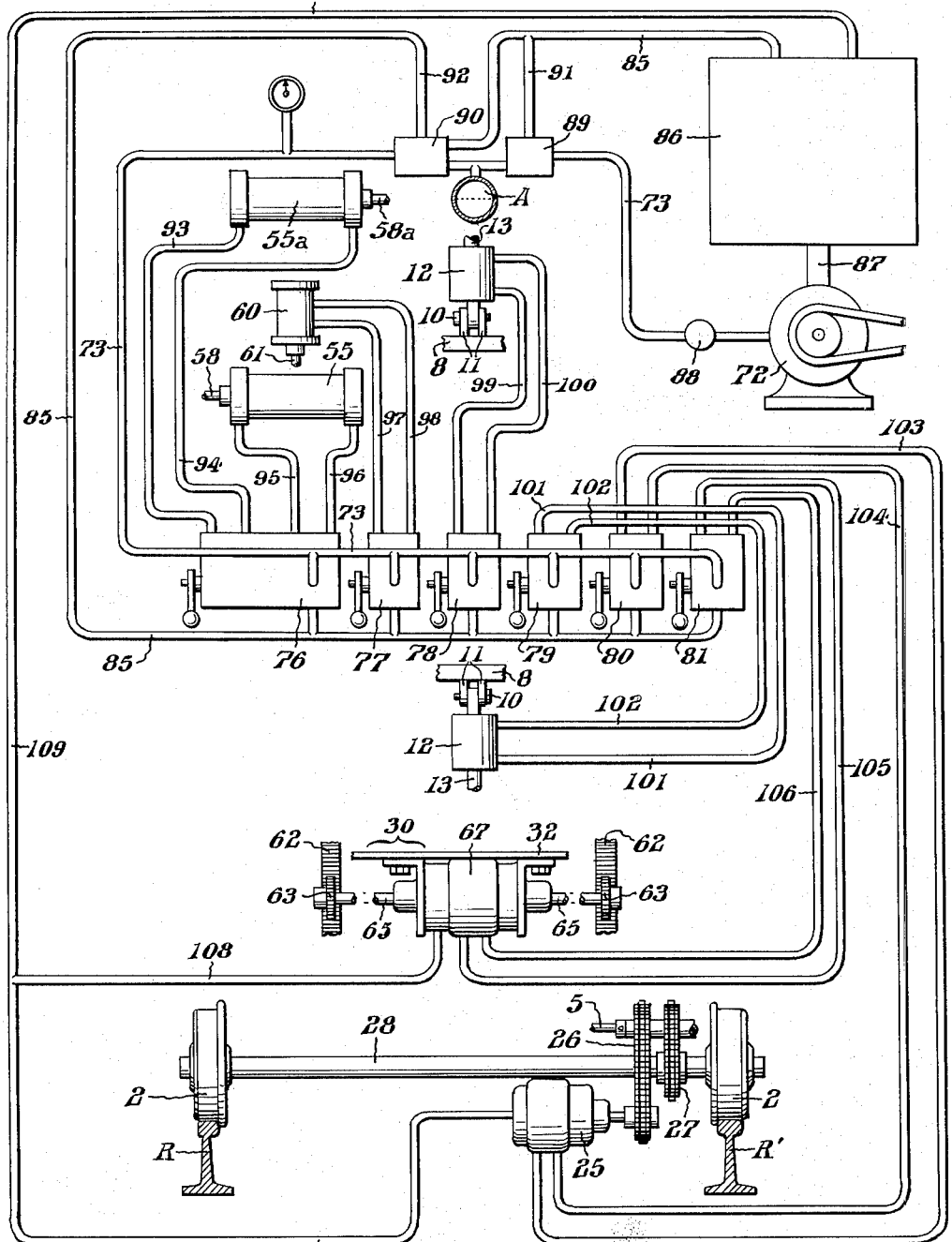

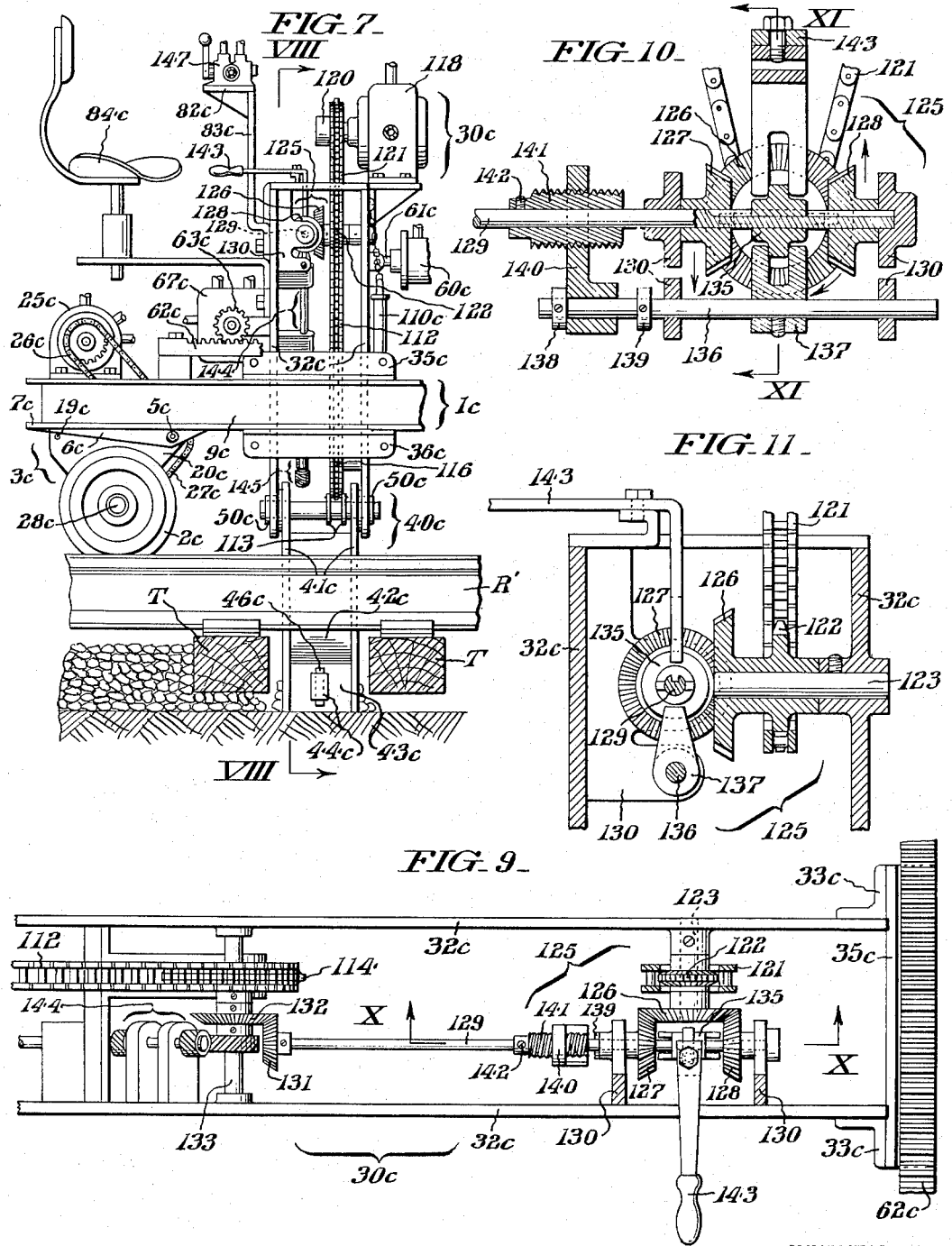

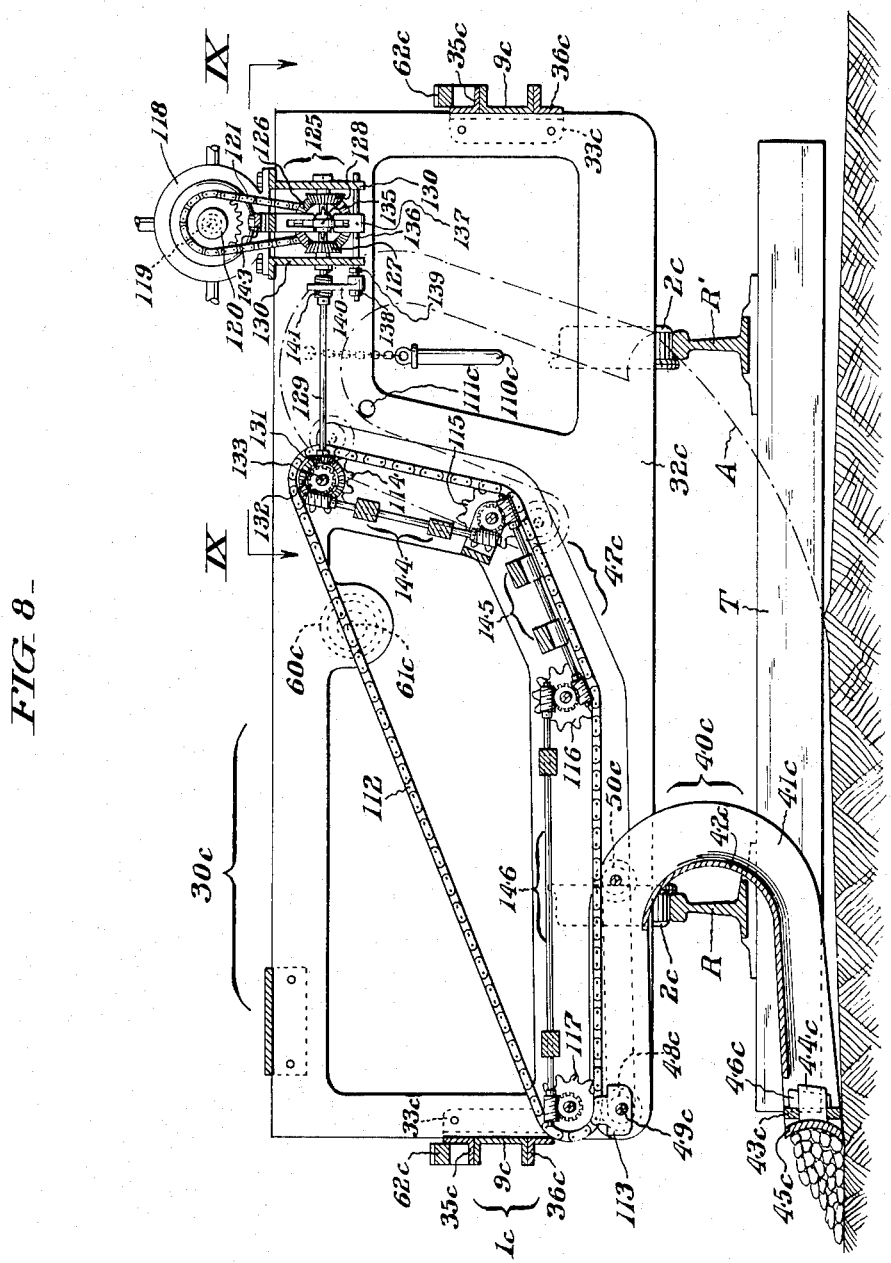

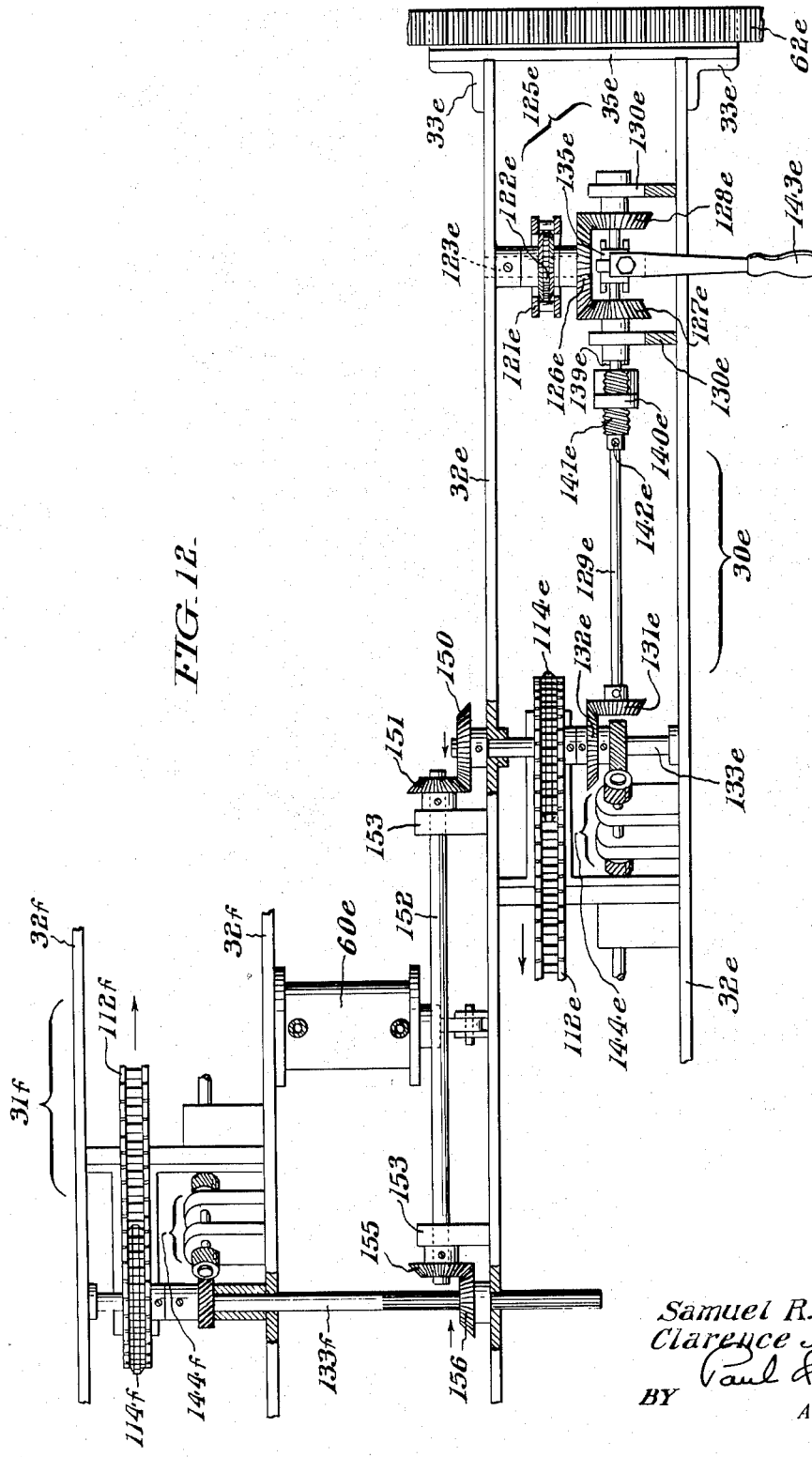

May 1, 1956        S. R. HURSH ET AL        2,743,539
ADJUSTMENT MECHANISM FOR KICKER-TYPE BALLAST REMOVER
Filed Feb. 19, 1953        10 Sheets-Sheet 9

FIG. 13.

INVENTORS:
Samuel R. Hursh &
Clarence J. Reigh,
BY Paul & Paul
ATTORNEYS.

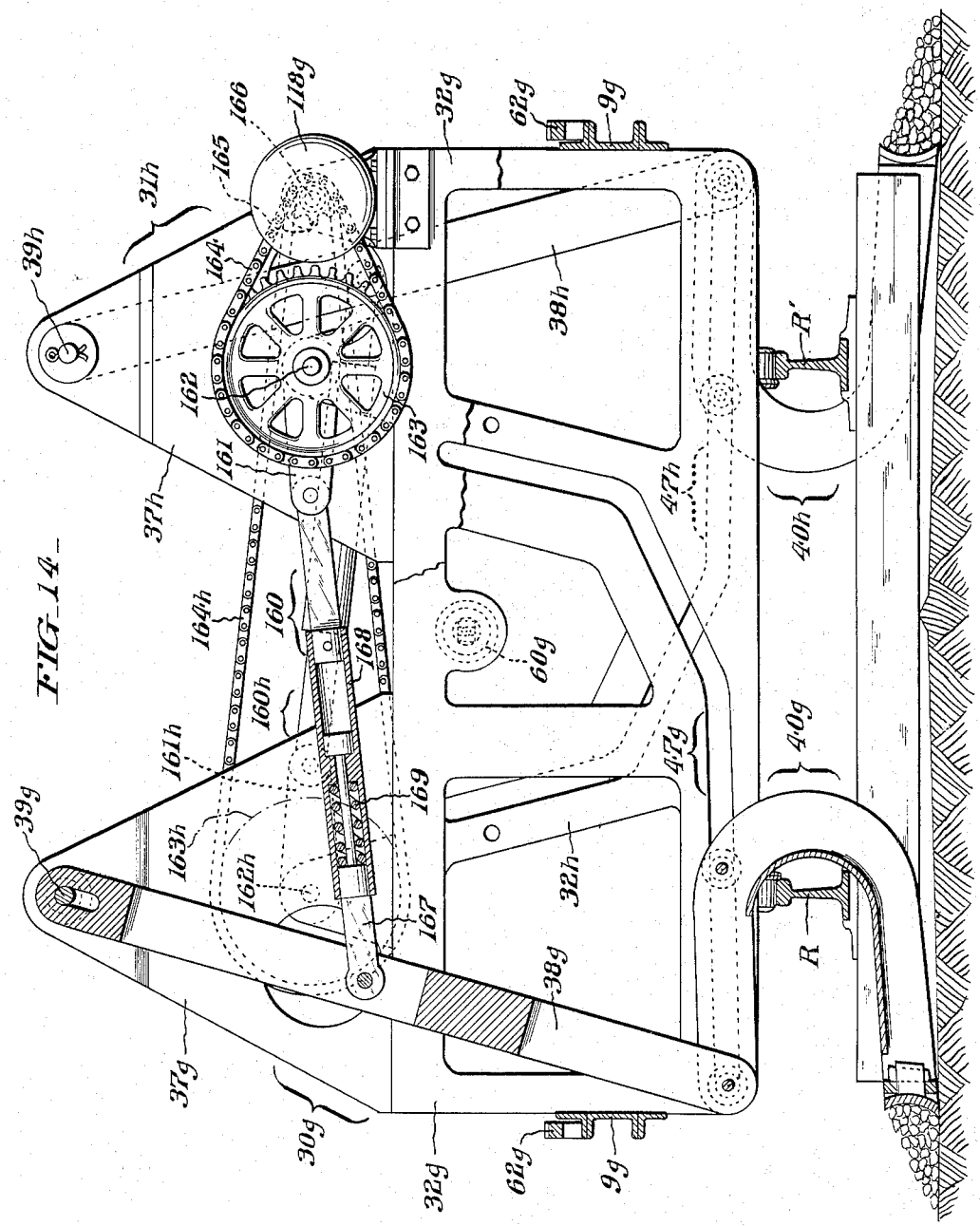

United States Patent Office 2,743,539
Patented May 1, 1956

2,743,539
ADJUSTMENT MECHANISM FOR KICKER-TYPE BALLAST REMOVER

Samuel R. Hursh, Bala-Cynwyd, and Clarence J. Reigh, Altoona, Pa.

Application February 19, 1953, Serial No. 337,744

12 Claims. (Cl. 37—104)

This invention relates to apparatus for removing ballast from railway tracks, that is to say, from the cribs between adjacent track ties.

The chief aim of our invention is to provide a simple and efficient mobile apparatus capable of being progressed on the rails of a track and having power actuated instrumentalities by which the ballast is quickly and easily displaced outwardly from the cribs between ties and discharged beneath the tie bridging portions of the rails onto the shoulders of the track bed in preparation for tie replacement and/or for ballast cleaning and renewal.

In connection with ballast removing apparatus having the above attributes, it is a further aim of our invention to provide adjustment facilities whereby the range of operation of the displacing or ejecting instrumentalities can be changed to compensate for variations in rail height.

Other objects and attendant advantages will appear from the following description of the attached drawings, wherein:

Fig. 6 is a diagrammatic view showing the power devices used in the apparatus and the controls therefor.

Fig. 7 is a fragmentary view in side elevation corresponding to Fig. 1, of an alternative embodiment of our invention.

Fig. 8 is a transverse sectional view taken as indicated by the angled arrows VIII—VIII in Fig. 7.

Fig. 9 is a fragmentary view in horizontal section looking as indicated by the angled arrows XI—XI in Fig. 8.

Fig. 10 is a fragmentary detail section taken as indicated by the angled arrows X—X in Fig. 9.

Fig. 11 is a fragmentary detail section taken as indicated by the angled arrows XI—XI in Fig. 10.

Fig. 12 is a view like Fig. 9 showing another alternative embodiment.

Figs. 13 and 14 are views similar to Figs. 2 and 3 showing still another alternative construction.

Figure 5:
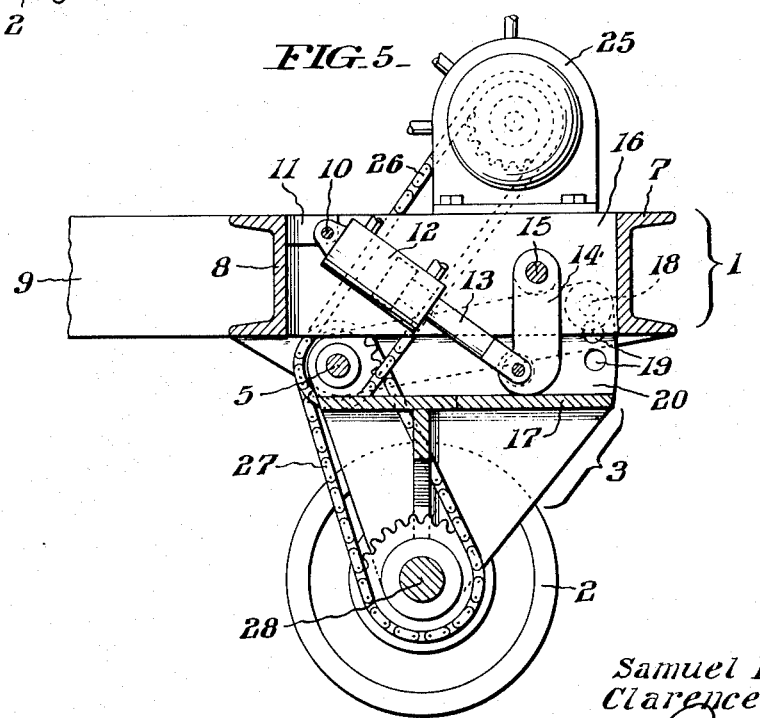
Fig. 5 is a fragmentary view in longitudinal section taken as indicated by the angled arrows V—V in Fig. 4.

Referring first more particularly to Figs. 1-5 of these illustrations, our improved apparatus in the form there shown comprises a car having a body 1 of structural steel, and wheels 2 for mobility on the rails R and R' of the track from the cribs of which the ballast is to be removed. To enable up and down adjustment of the car body 1 relative to the track for a purpose later on explained, each wheel truck frame 3 is pivotally connected at opposite ends, by a shaft 5, to channel bars 6 rigidly incorporated between the corresponding transverse end beam 7 of the car frame and an intermediate transverse beam 8 disposed somewhat inward of the side longitudinals 9 of said frame, see Fig. 5. Fulcrumed at 10 to lugs 11 on each intermediate transverse beam 8 is a single acting pressure fluid cylinder 12 whereof the piston 13 is pivotally connected to the swinging ends of a pair of links 14 hung from a pin 15 which extends crosswise between another pair of channel bars 16 of the car frame. From Fig. 5 it will be noted that the swinging ends of the links 14 are rounded to bear upon the cross web 17 of the truck frame 3. Accordingly, as pressure fluid is admitted into cylinder 12, the corresponding end of the car body will be raised by camming action of the links 14 with the web 17 of the truck frame 3 as shown in Fig. 5. By means of retractable stop pins 18 passed through the bars 6 and selectively engageable into spaced holes 19 in the end portions 20 of the truck frame 3 concentrically arranged relative to shaft 5, the car body is held at the desired elevation after adjustment. For propulsion of the car on the track, we have mounted on the body 1 above one of the trucks 3, a pressure fluid motor 25 which, through sprocket chains 26 and 27, serves to drive the wheel axle 28 of such truck.

Mounted on car body 1, with capacity for being shifted longitudinally of the car, are two carriages 30 and 31 which, except for reverse arrangement of certain of the parts associated with them, are identical in construction as will presently be seen. As shown, carriage 30 comprises a pair of spaced transversely disposed parallel frame members 32, which are rectangular in configuration and extend downward between the side longitudinals 9 of the car body 1. At opposite ends, the frame members 32 are rigidly connected by vertical angle pieces 33 to spaced horizontal angle pieces 35 and 36 which are in sliding engagement with the side longitudinals 9 of the car body. Riveted to or integrated with the members 32 are upward bracket projections 37, and swingable in the interval between said members is an arm 38 which is suspended from a fulcrum pin 39 extending crosswise between said bracket projections at the top. To the lower or distal end of arm 38 is pivotally connected one end of ballast displacing element or ejector 40. As shown, ejector 40 is U-shaped in configuration for capacity to clear the track rail R incident to being urged outward to the position in which it is shown in full lines in Fig. 3 during the active stroke of arm 38. For the sake of ruggedness, the ejector 40 is fashioned from stiff plate metal with spaced side portions 41 connected partway by a cross web 42. At the free or distal end of ejector 40, its side portions 41 are connected by a cross web 43, having centrally thereof, a rectangular hole for reception of the correspondingly configured shank 44 of a replaceable blade element 45, the latter being secured by a wedge pin 46 passed through the rearwardly protruding portion of said shank. Cut into the side members 32 of the carriage 30 are tracking slots 47 for rollers 48 on the pin 49 connecting the ejector 40 to the arm 38, and rollers 50 on the upper leg of the said ejector 40 in spaced relation to said rollers 48. It is to be noted that each slot 47 has a bottom portion 47' which is upwardly inclined slightly to the horizontal from near one end of the frame member 32 toward the center of the latter, an intermediate portion 47'' which extends upward at a somewhat sharper angle, and an upper terminal portion 47''' at a still sharper angle. Due to the described shaping of the slots 47, ejector element 40 is so controlled in its movement from the fully retracted dash and dot line position to the full line position in Fig. 3, that the blade element 45 is caused to take a downward path starting in an arc A to clear the rail R' and strike the ballast at the center of the track bed, and thereafter in a substantially straight line path at a slight declination to the horizontal in the direction of the shoulder of the track bed beneath the rail R to a point beyond the ends of the ties T. Thus, in this way, the ballast is displaced from the crib and discharged beneath the rail R laterally onto the shoulders of the track bed with maintenance in the latter of the desired slope for water drainage. Due to the inclination of the portions 47" of the guide slots 47, the arm 38 is lifted somewhat during its counterclockwise retractive stroke so that its swinging end will clear the rail R', this movement being allowed due to the loose connection of the upper end of said arm at 51 with the fulcrum pin 39. Arm 38 is power actuated by a double acting pressure fluid cylinder 55 which is pivotally connected to a bracket 56 on a fixed saddle piece 57 bridged between the tops of the frame members 32, the piston rod 58 of said cylinder being pivotally connected to said arm at a point 59 intermediate the ends thereof.

Carriage 31 is identical with carriage 30 both from the standpoint of its construction and its appointments except in that arm 38a, ballast displacing element 40a, and actuating cylinder 55a are reversely positioned and operative in another crib of the track. Accordingly, in order to dispense with repetitive description, all other elements of carriage 31 not specifically referred to but having their counterparts in carriage 30, have been identified by the same reference numerals previously employed with addition however in each instance, of the latter "a" for convenience of more ready distinction.

To enable shifting of carriages 30, 31 relative to each other, we have provided a double acting pressure fluid cylinder 60 which is bolted to carriage 31 and whereof the piston 61 is connected to carriage 30. A means is also provided whereby the carriages 30, 31 can be moved together lengthwise of the car, the latter means including a pair of toothed racks 62 which are fixedly supported respectively from the side longitudinals 9 of the car frame. Meshing with racks 62 are spur pinions 63 which are fast on opposite ends of a crosswise shaft 65 rotatively supported in bearings 66 on one of the frame members 32 of carriage 30 and arranged to be driven by a pressure fluid motor 67 mounted on said carriage.

Figure 1:
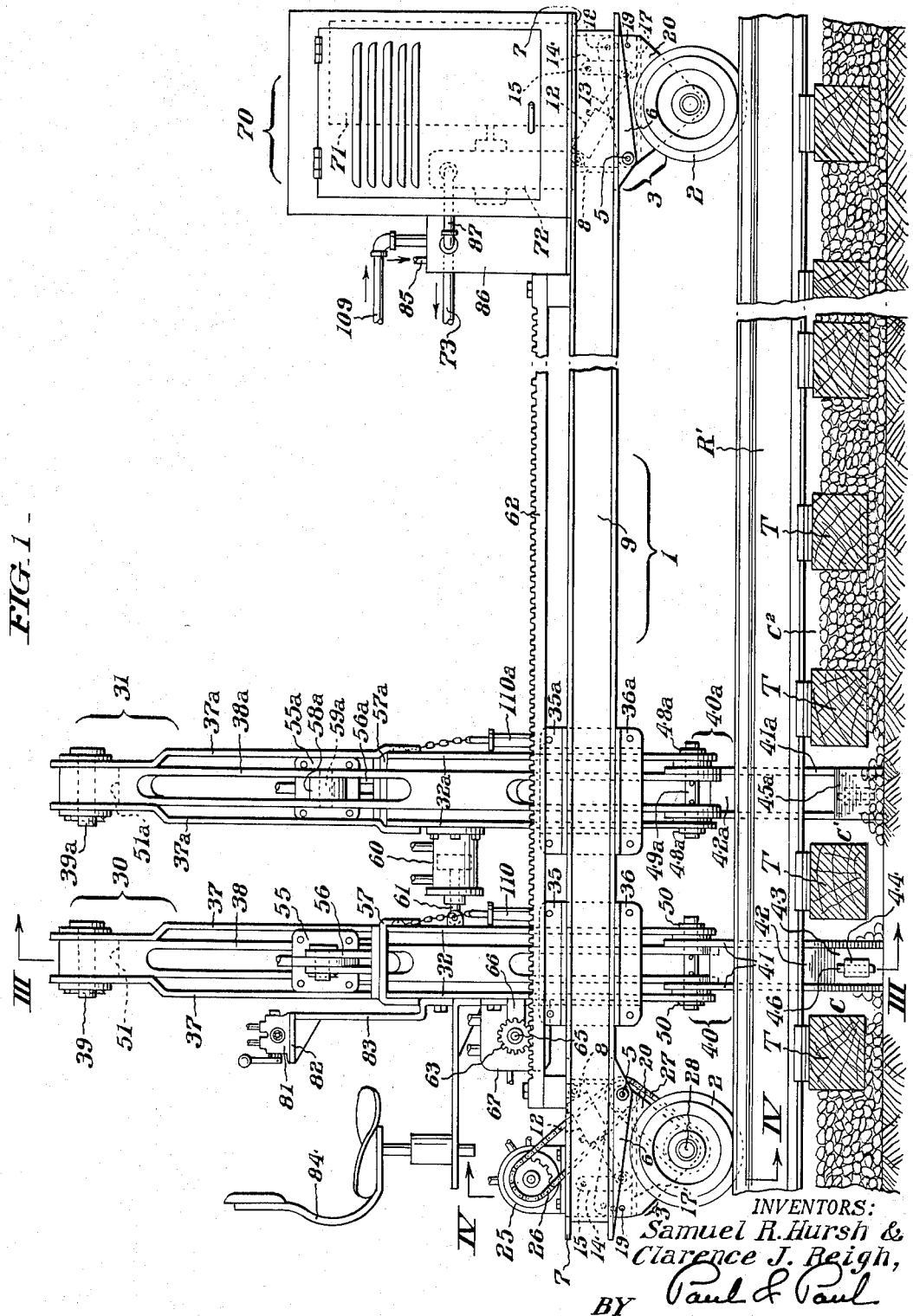
Fig. 1 is a view in side elevation of a ballast removing apparatus conveniently embodying our invention.
Figure 2:
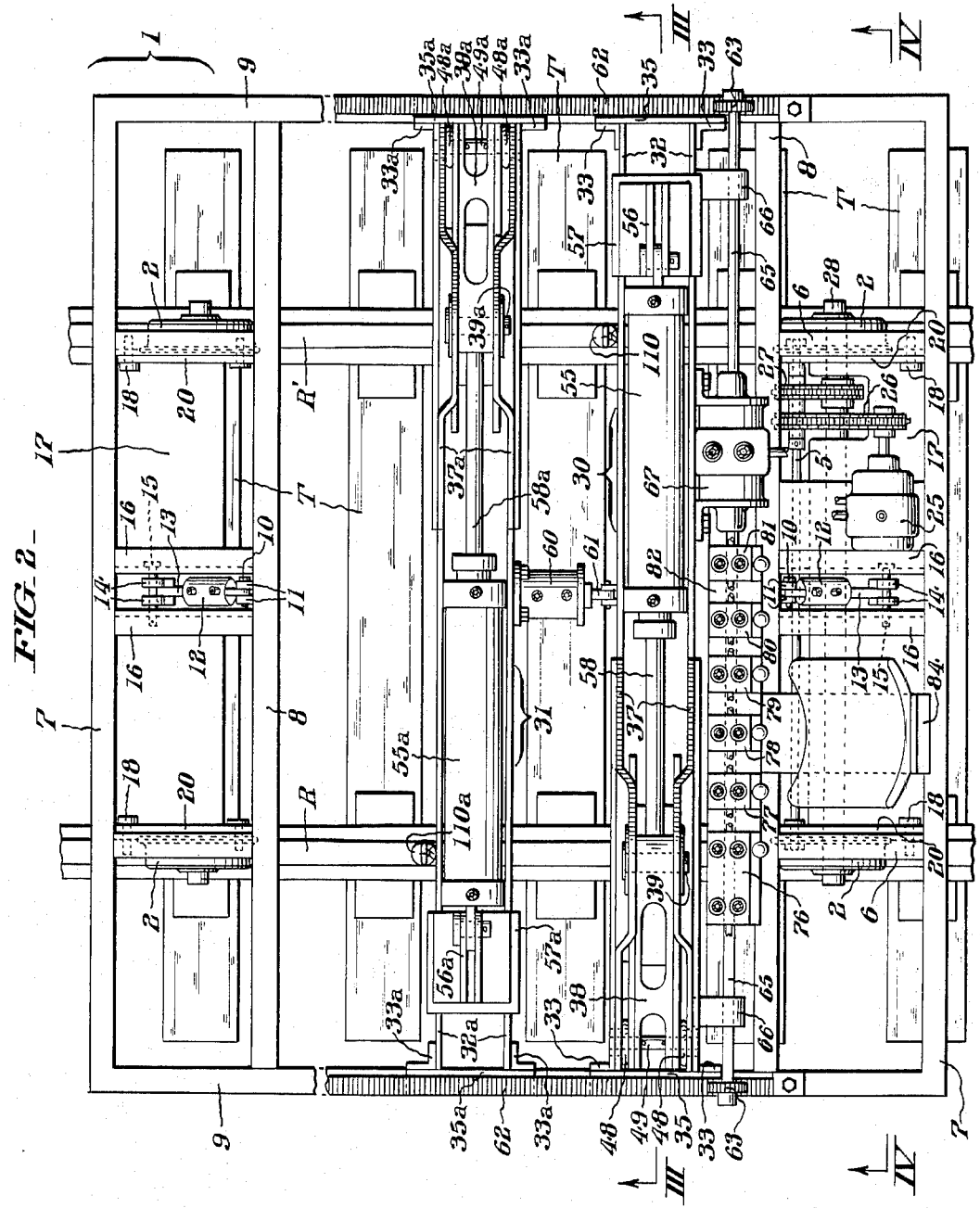
Fig. 2 shows the apparatus in top plan.
Figure 3:
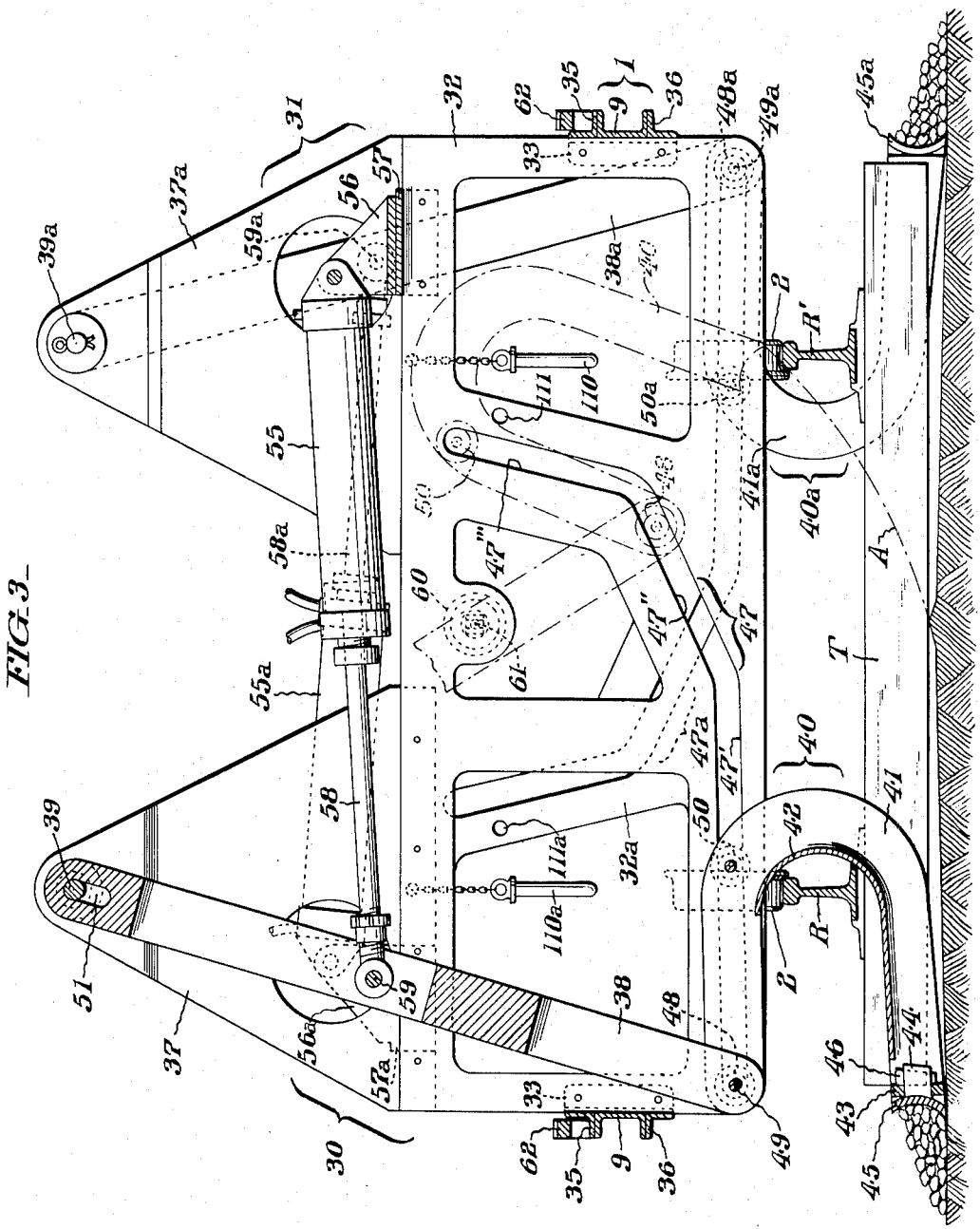
Fig. 3 is a transverse sectional view taken as indicated by the angled arrows III—III in Figs. 1 and 2.
Figure 4:
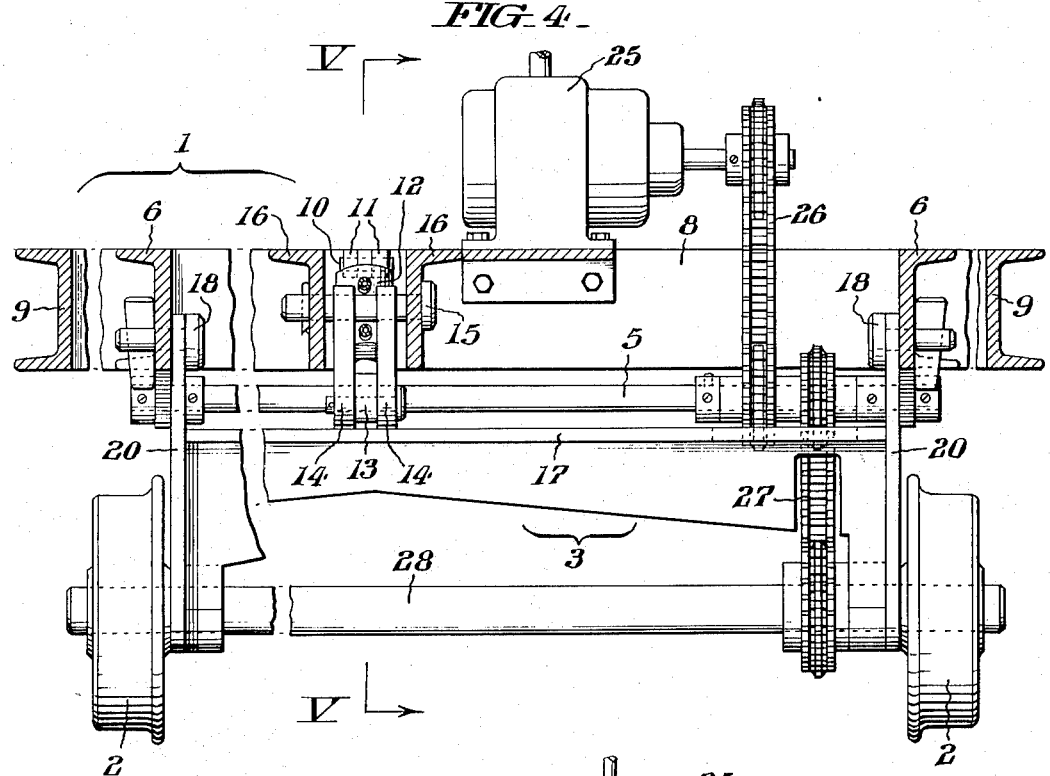
Fig. 4 is a cross section taken as indicated by the angled arrows IV—IV in Figs. 1 and 2.

Mounted on the car body 1 at the front or right hand end in Fig. 1 is a housed power plant 70 which may comprise an internal combustion motor 71 and a rotary pump 72 driven thereby for pressurizing oil or other fluid used to operate the cylinders 12, 55, 55a and 60 and the motors 25 and 67. The pressure fluid piping system shown in Fig. 6 may be arranged on the car in any convenient manner, the same including a main 73 which extends from pump 72 and, through top branches, connects into individual manually-operable valves 76, 77, 78, 79, 80 and 81 for controlling flow of the pressure fluid to cylinders 55, 55a, 12, 60, propelling motor 25 and carriage shifting motor 67. These valves are mounted side by side, see Figs. 1 and 2, on a shelf 82 supported by upstanding brackets 83 on the car body so as to be convenient of access to an operator seated in a chair 84 at the rear end of the car. Exhaust from control valves 76—81 is conducted through another main 85 which extends to a storage reservoir 86 wherefrom the fluid is drawn by the pump 72 through a connecting conduit 87. Interposed in flow main 73 are a check valve 88, an accumulator A, a relief valve 89, and an unloading valve 90, the latter two being in communication with return main 85 by way of branch pipes 91 and 92. Extending between control valve 76 and the ejector actuating cylinders 55 and 55a are pipes 93, 94 and 95, 96 respectively, and extending between control valve 77 and cylinder 60 are pipes 97, 98. Similarly extending between control valves 78 and 79 and the car body lifting cylinders 12 are pipes 99, 100 and 101, 102 respectively. From control valve 80 to car propelling motor 25 extend pipes 103 and 104; and from control valve 81 to carriage drive motor 67 extend pipes 105 and 106. Also, as shown, the motors 25 and 67 are connected through branches 107 and 108 of a return main 109 which discharges into reservoir 86. It is to be understood that the control and other valves used in the piping are all of well known commercially available types of which the construction and functioning is well understood.

Operation

With the car positioned on the track rails R and R', the operator, seated in chair 84, manipulates the valves 77 and 81 for shifting of the carriages 30 and 31 relative to each other by the cylinder 60 and/or both together by means of the motor 67 to spot them centrally over two adjacent cribs C, C' of the track, and thereafter manipulates the valve 76 to bring the ejectors 40 and 40a into operation, the latter being thereby simultaneously moved outward to remove half the ballast from each of the two cribs. If necessary to insure complete removal of the ballast, he may further manipulate the valves 77 and 81 for shifting of the carriage 31 relative to the carriage and/or shifting them together in one direction or the other for action closer to the ties as may be necessary for complete removal of the ballast. With this accomplished, the valve 76 is shut off after ejectors 40 and 40a are retracted, whereupon the carriages 30, 31 are moved forward together on the car (rightward in Fig. 1) by a distance equal to the spacing of the ties to spot carriage 30 over the crib C' and carriage 31 over the crib C², when by actuation of the valve 76, the ejectors 40 and 40a, are again brought into action, the former to remove the remaining ballast from the crib C' and the latter to remove half of the ballast from crib C². This procedure is repeated over and over again for removal of the ballast from successive cribs of the track. By employing the ejectors simultaneously, the thrust reaction of the one counterbalances the thrust reaction of the other as a result of which the lateral strains imposed upon the rails are of small moment and, therefore, negligible. Due to the provision of the liberal openings in the side frame members of the carriages 30 and 31, the ejectors are within the range of the operator's vision and spotting is therefore rendered relatively easy. When the car is progressed over relatively long distances on the track, the ejectors are locked in raised or retracted position by pins 110 and 110a which are insertable into registering holes 111 and 111a in the side frames of the respective carriages 30 and 31 in a manner obvious from Fig. 3.

In the alternative embodiment illustrated in Figs. 7–11, the ejector 40c is guided in its movement, as in the first described embodiment, by rollers 49c and 50c constrained to traverse the angular cam slots 47c in the frame members 32c of carriage 30c. Here, however, instead of a cylinder-actuated arm for moving the ejector, we have provided an endless chain 112 to which said ejector is connected at 113. As shown, chain 12 is trained about sprocket wheels 114, 115, 116 and 117 whereof the shafts are journalled in the side frames 32c at locations such that the lower run of said chain follows a course parallel with the cam slots 47c. The means shown for driving chain 112 includes a pressure fluid motor 118 which is mounted atop of members 32c. Frictionally mounted on the shaft 119 of motor 118 is a sprocket wheel 120 which, through a chain 121, is connected to a sprocket pinion 122 on the shaft 123 of a reversing gear mechanism 125 supported between frame members 32c. The bevel gear 126 meshes with two oppositely positioned bevel pinions 127 and 128 loosely mounted on a horizontal shaft 129 which extends through one of the bearings 130 of the mechanism 125. A bevel pinion 131 affixed to the distal end of shaft 129 meshes with a bevel gear 132 on the shaft 133 of the sprocket wheel 114 about which the ejector actuating chain 112 moves. Keyed to shaft 129 is a clutch collar 135 which is shiftable into engagement with one or the other of the bevel pinions 127, 128 by an endwise reciprocatable slide rod 136 having an engaging clevis 137 secured thereto. Loosely connected to rod 136 between a pair of spaced collars 138 and 139 is a follower arm 140 which is in threaded engagement with a screw sleeve 141 fixed at one end of rod 129. As best shown in Fig. 10, sleeve 141 is adjustably secured to shaft 129 by a set screw 142. Clutch collar 135 is shiftable manually by means of the hand lever shown at 143 in Figs. 7 and 9 convenient of access from the operator's chair 84c. In order to minimize strains in the chain 112, the shafts of the sprockets 114, 115, 116 and 117 are coordinated for rotation in unison by the spiral gear transmission connections shown and generally designated respectively by the numerals 144, 145 and 146 in Fig. 8. A hand valve indicated at 147 in Fig. 7, is provided for controlling the operation of motor 118.

In order to obviate the necessity for repetitive description, all of the other elements shown but not particularly referred to in Figs. 7–11 having their counterparts in the first described embodiment, are identified by the same identifying numerals previously used with addition in each instance of the letter "c."

Normally, with the motor 118 running and the clutch control handle 143 in neutral as in Figs. 9 and 10, chain 121 and the bevel gears 126, 127 and 128 will turn idly without impartation of movement to ejector element 40c. However, by shifting handle 143 to the left, pinion 127 will be clutched to shaft 129 with the result that, through the interposed gear connections 131 and 132, chain 112 will be driven to move ejector element 40c in one direction. By the leftward shift of handle 143, rod 136 will be moved correspondingly and collar 139 thereon be brought into contact with follower 140. As shaft 129 rotates, follower 140 will gradually be moved rightward by the action of screw sleeve 141 to eventually disengage clutch collar 135 from gear pinion 127, with consequent restoration of handle 143 to the normal neutral position and cessation in the rotation of shaft 129. It is to be understood that screw sleeve 141 is so set on shaft 129 that the action just described occurs when the ejector element has completed its movement in one direction. To induce movement of the ejector element 40c in the opposite direction, handle 143 is shifted rightward to engage clutch collar 135 with pinion 128 whereby shaft 129 will be oppositely driven, and collar 138 brought into contact with follower 140. By the reverse rotation of screw sleeve 141, follower 140 will be gradually moved to the left and eventually cause withdrawal of clutch collar 135 from pinion 128 to prevent further rotation of shaft 129 when ejector element 40c has reached the limit of its movement in the opposite direction. In the event, that shaft 129 should accidently overrun in either direction, frictionally mounted sprocket pinion 120 on the shaft of motor 118 will simply slip and thus prevent injury to or derangement of the mechanism. With this arrangement, it is possible to stop the ejector element 40c at any point in its outward or inward movement by shifting handle 143 either leftward or rightward as may be desirable in progressively displacing the ballast from the track cribs.

It is to be understood that, as in the first disclosed embodiment, a second ejector carriage (not illustrated) is provided in the alternative embodiment, of which the construction and appointments will be the same as in Figs. 7–11 but with the ejector element of such second carriage arranged to operate in opposed relation to the ejector element 40c in an adjacent crib of the railway track.

In the modification of Fig. 12 which shows the apparatus fragmentarily in top plan, the carriage 30e is like that of Figs. 7–11 except as noted below. Here shaft 133e of carriage 30e is extended through, and protrudes beyond the frontal frame member 32e of said carriage. Affixed to the protruding end of shaft 133e is a bevel gear 150 that meshes with a bevel gear 151 at one end of a transverse shaft 152 rotatively supported in fixed bearings 153 on the frontal frame member of carriage 30e. A bevel gear 155 at the opposite end of shaft 152 meshes with a bevel gear 156 which is slidably splined on shaft 133f of the second ejector carriage 31f, the distal end of said shaft 133f passing slidingly through a bearing aperture in the frontal frame member 33e of carriage 30e. But for reversal in the arrangement of the moving parts thereof, carriage 31f is identical with carriage 30e and, accordingly, here again the same reference numerals, but with addition in each instance of the letter "f," have been used to indicate corresponding parts so as to preclude the necessity for duplicate description. It will be seen that, through the transmission connections, 150, 151, 152, 155 and 156, shaft 133f of carriage 31f is driven from shaft 133e of carriage 30e. The ejector actuating chains 112e and 112f are thus concurrently operated, the direction of their movement and that of the ejector elements (not illustrated) depending upon whether the clutch control handle 143e is shifted leftward or rightward in the same manner as described above in connection with the embodiment of Figs. 7–11. The pressure fluid cylinder 60e in Fig. 12 is intended to be used like cylinder 60 of the first described embodiment to space carriage 31f from carriage 30e as may be required to center said carriages over different ballast cribs of the railway track, carriage 30e being shiftable on the car frame likewise by means whereof one rack 62e only is shown, similar to the means provided for that purpose in said first described embodiment.

In the alternative embodiment shown in Figs. 13 and 14, the actuating arm 38g for the ejector element 40g is connected by a link 160 to a crank 161 whereof the trunnions 162 have bearing in the frame members 32g of carriage 30g. Secured to one of the crank trunnions 162 is a sprocket wheel 163 which, through a chain 164, is connected to a spur pinion 165 on the shaft 166 of a driving motor 118g. Accordingly, during rotation of crank 161, arm 38g is swung back and forth about fulcrum 39g and the ejector element 40g thereby caused to follow the path determined by the slots 47g in the frame members 32g of carriage 30g in the same manner as described in connection with the previous embodiments. As shown, link 160 comprises two telescopically-connected components 167 and 168 between which a compression spring 169 is interposed. By virtue of this construction, link 160 will yield to endwise contraction in the even that ejector element 40g should meet with any abnormal obstructions incident to being thrust outward on its ballast removing stroke. In this way, injury to or derangement of the parts is effectively precluded. The actuating arm 38h for the ejector element 40h of the second or companion carriage 31h is similarly connected by a telescoping link 160h to a crank 161h having its trunnions journalled in the frame members 32h of said carriage. By means of a chain 164h, a sprocket wheel 163h affixed to one of the trunnions 162h of crank 161h is connected to a second sprocket pinion 165h on motor shaft 166 which, see Fig. 13, is extended and passes slidingly through the parallel frame members 32h of carriage 31h. The distal end of motor shaft 166 is fluted as conventionally indicated in Fig. 13, for sliding drive engagement therewith of pinion 165h which is constrained against axial movement relative to the contiguous frame member 32h of carriage 31h. Accordingly, here as in the embodiment of Fig. 12, the ejector elements 40g and 40h are actuated from a single power source, said elements being opposed in their movements due to the opposed setting of cranks 161 and 161h as best shown in Fig. 13.

Having thus described our invention, we claim:

1. In apparatus for removing ballast from cribs between adjacent ties of a railway track, a wheeled car having a frame with a clearspace between side longitudinals; at least two carriages extending crosswise within the clearspace between the side longitudinals of the car frame, said carriages being slidably engaged with said longitudinals so as to be shiftable along the car between adjacent pairs of cribs; means on the car for so shifting the carriages; arms hung from pivots on the respective carriages and constrained to swing within the clearspace of the car frame for oscillation transversely of the car; power means on the carriages for concurrently swinging the arms contrariwise; and ballast displacing elements connected to the distal ends of the arms and operative, as the arms are swung outwardly, to displace the ballast from centers of different cribs beneath opposite track rails onto the shoulders of the track bed.

2. Ballast removing apparatus according to claim 1, further including coupling means whereby the carriages are connected together with capacity for adjustment relative to each other for change in their spacing.

3. Ballast removing apparatus according to claim 1, wherein the carriages are connected together, and further including means for shifting the carriages bodily along the car for operation of the displacing elements in successive pairs of the cribs.

4. Ballast removing apparatus according to claim 1 further including a pressure fluid cylinder affixed to one carriage and having its piston connected to the other carriage; and means for selectively admitting pressure fluid into opposite ends of the cylinder to adjust the spacing of the carriages.

5. Ballast removing apparatus according to claim 1, wherein the power means on each carriage comprises a double acting cylinder pivotally connected to the carriage with its piston rod pivotally connected to the arm medially of the length of the latter, and further including manual means for controlling admission of pressure fluid selectively into opposite ends of the cylinder.

6. Ballast removing apparatus according to claim 1, wherein the carriages are connected together, further including power means for shifting the carriages bodily along the car for operation of the displacing elements in successive groups of the cribs; and manual means on the car for respectively controlling the power means by which the carriages are shiftable along the car and the power means by which the arms are actuated.

7. Ballast removing apparatus according to claim 1, wherein the carriages are connected together, said apparatus further including power means for propelling the car on the rails; power means for shifting the carriages along the car for operation of the ballast displacing elements in successive groups of the cribs; and manual means on the car for respectively controlling the car propelling means, the power means by which the carriages are shiftable along the car, and the power means by which the arms are actuated.

8. Ballast removing apparatus according to claim 1, wherein the power means includes cranks with their shafts respectively borne in the carriages and connected by links with the arms, a motor on one of the carriages, and speed reducing sprocket chain connections between the shaft of the motor and the shafts of the respective cranks.

9. Ballast removing apparatus according to claim 1, wherein the carriages are connected with capacity for spacial adjustment relative to each other; and wherein the power means comprises a motor supported on one carriage, and sprocket pinions on the shaft of the motor respectively connected to the shafts of the respective cranks by speed reducing gearing, said gearing including pinions on the motor shaft one of which has a sliding spline connection with said shaft.

10. In apparatus for removing ballast from cribs between adjacent ties of a railway track, a car having a frame with wheels for mobility on the track; a pair of arms hung from overhead pivots on the frame for oscillation transversely of the car; power means for concurrently swinging the arm contrariwise; U-shaped ballast displacing elements each having the end of one of its legs pivotally connected to the distal end of the arms and provided at the end of its other leg with a ballast pusher blade; and guide means including cam tracks on the car engaged by projections on the first mentioned legs of the respective displacing elements spaced from the pivotal connections of the latter with the arms, said cam tracks being so configured as to cause the pusher blades to follow downward arcuate paths into contact with the ballast at the centers of the cribs during the active swing of said arms, and thereafter to move susbtantially horizontally outward beneath and beyond the track rails to displace the ballast from the cribs.

11. In apparatus for removing ballast from cribs between adjacent ties of a railway track, a car having a frame with wheels for mobility on the track; a pair of arms respectively hung from separate transversely-spaced overhead pivots on the frame for oscillation transversely of the car; U-shaped ballast displacing elements each having the end of one of its legs pivotally connected to the distal end of one of the arms and provided at the end of its other leg with a ballast pusher blade; and power means for concurrently swinging the arms contrariwise, said power means comprising chains trained about separate groups of sprocket wheels engaged by projections on the first mentioned legs of the respective displacing elements spaced from the pivotal connections of the latter with the arms, and groups of sprocket wheels defining devious courses of travel for the chains whereby, during the active swing of the arms, the pusher blades are caused to follow downward arcuate paths into contact with the ballast at the centers of the cribs and thereafter to move substantially horizontally outward beneath and beyond the track rails to displace the ballast from the cribs.

12. Ballast removing means according to claim 10, wherein the power means further includes a motor, and reversible gear connections between the motor and of the sprocket wheels of the respective groups.

References Cited in the file of this patent

UNITED STATES PATENTS

| | | |
|---|---|---|
| 1,776,830 | Chenault | Sept. 30, 1930 |
| 1,926,397 | Mosel | Sept. 12, 1933 |
| 2,082,594 | Philbrick | June 1, 1937 |
| 2,132,176 | McWilliams | Oct. 4, 1938 |
| 2,209,732 | Huey | July 30, 1940 |
| 2,345,612 | Lewis | Apr. 4, 1944 |
| 2,624,129 | Steece | Jan. 6, 1953 |
| 2,669,041 | Fox et al. | Feb. 16, 1954 |

FOREIGN PATENTS

| | | |
|---|---|---|
| 842,215 | Germany | June 23, 1952 |